United States Patent
Huang

(10) Patent No.: US 9,519,112 B2
(45) Date of Patent: Dec. 13, 2016

(54) OPTICAL FIBER CONNECTOR

(71) Applicant: HON HAI PRECISION INDUSTRY CO., LTD., New Taipei (TW)

(72) Inventor: Po-Wei Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 743 days.

(21) Appl. No.: 13/965,206

(22) Filed: Aug. 13, 2013

(65) Prior Publication Data

US 2016/0216455 A1   Jul. 28, 2016

(30) Foreign Application Priority Data

Dec. 26, 2012   (TW) .............................. 101150016 A

(51) Int. Cl.
  *G02B 6/36*   (2006.01)
  *G02B 6/38*   (2006.01)

(52) U.S. Cl.
  CPC ........... *G02B 6/3839* (2013.01); *G02B 6/3843* (2013.01); *G02B 6/3853* (2013.01); *G02B 6/3885* (2013.01)

(58) Field of Classification Search
  CPC ... G02B 6/3839; G02B 6/3843; G02B 6/3853; G02B 6/3885
  USPC ...................................... 385/79, 83
  See application file for complete search history.

(56) References Cited

U.S. PATENT DOCUMENTS

| | | | | |
|---|---|---|---|---|
| 5,993,070 A | * | 11/1999 | Tamekuni | G02B 6/3846 385/137 |
| 6,062,740 A | * | 5/2000 | Ohtsuka | G02B 6/3833 385/77 |
| 2002/0163740 A1 | * | 11/2002 | Uekawa | G02B 3/00 359/808 |

* cited by examiner

*Primary Examiner* — Jerry Blevins
(74) *Attorney, Agent, or Firm* — Zhigang Ma

(57) ABSTRACT

An optical fiber connector for positioning a number of optical fibers is provided. The optical fiber connector includes a main body and a pressing block. The main body defines an assembling recess and a number of positioning grooves defined in a bottom surface of the assembling recess. The positioning grooves each correspond to an optical fiber. An end of each optical fiber is received in a corresponding positioning groove, and the pressing block is received in the assembling recess.

7 Claims, 5 Drawing Sheets

OPTICAL FIBER CONNECTOR

BACKGROUND

1. Technical Field

The present disclosure relates to connectors, and particularly to a connector for optical fibers.

2. Description of Related Art

Optical fiber connectors may define a circular positioning hole for receiving an optical fiber. It is required that the optical fiber is precisely positioned to reduce insertion loss. However, if a roundness of the positioning hole is less than satisfactory, which often happens due to limited manufacturing precision, the optical fiber may deviate from a desired position.

Therefore, what is needed is an optical fiber connector addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
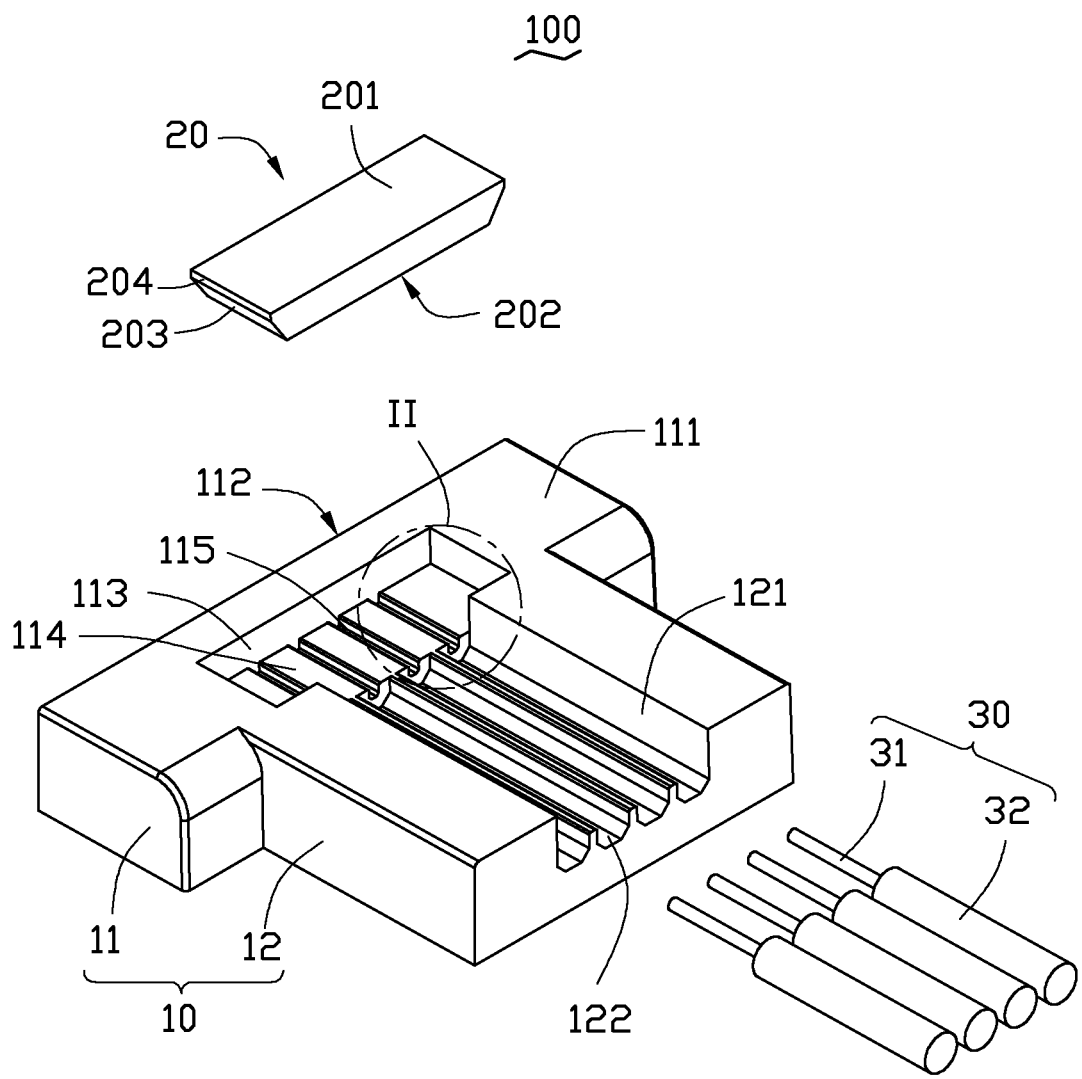
FIG. 1 is an exploded view of an optical fiber connector according to one embodiment. The optical fiber connector comprises a main body.
Figure 2:
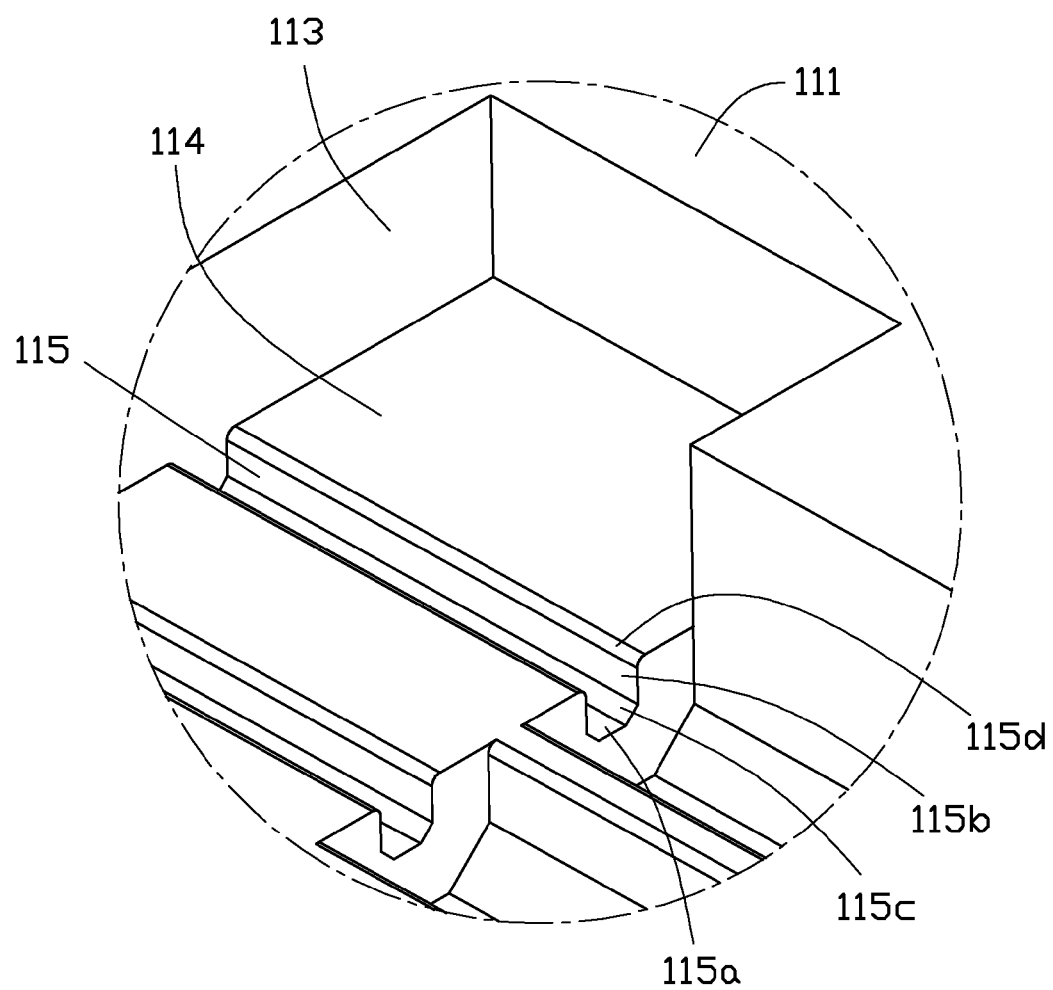
FIG. 2 is an enlarged view of portion II of the optical fiber connector of FIG. 1.
Figure 3:
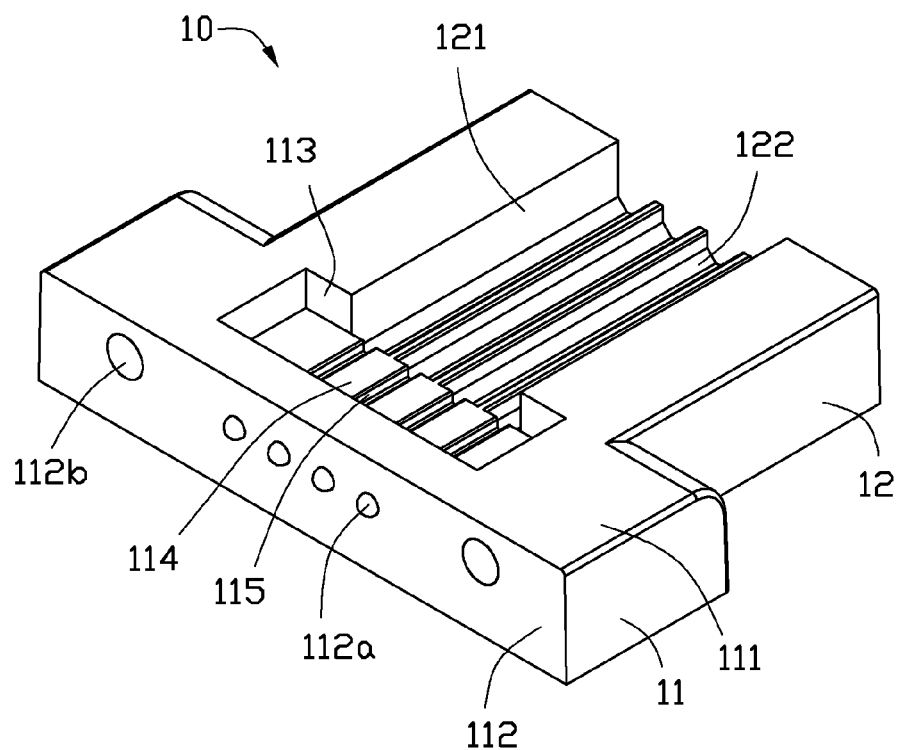
FIG. 3 shows the main body of the optical fiber connector of FIG. 1 from another angle.

FIGS. 1-3 show one embodiment of an optical fiber connector 100 configured for positioning a number of optical fibers 30 therein. The optical fiber connector 100 includes a main body 10 and a pressing block 20.

The main body 10 includes a positioning portion 11 and an extending portion 12 connected to the positioning portion 11. The positioning portion 11 includes a first surface 111 and a second surface 112 substantially perpendicular to the first surface 111. The positioning portion 11 defines a first assembling recess 113 in the first surface 111. In this embodiment, the first assembling recess 113 is substantially rectangular-shaped. Alternatively, the first assembling recess 113 may be other suitable shapes, such as any quadrilateral shape, for example. The first assembling recess 113 includes a first bottom surface 114. The first bottom surface 114 defines a number of positioning grooves 115. The positioning grooves 115 extend along a direction substantially perpendicular to the second surface 112. In this embodiment, each positioning groove 115 includes two sidewalls 115b opposite to each other, and a second bottom surface 115a. The sidewalls 115b are connected substantially perpendicularly to the first bottom surface 114, and the second bottom surface 115a is substantially parallel to the first bottom surface 114. Each positioning groove 115 includes a rib portion 115c between each sidewall 115b and the second bottom surface 115a. Each positioning groove 115 further includes a rounded edge 115d between each sidewall 115b and the first bottom surface 114.

The main body 10 includes a number of lens portions 112a formed on the second surface 112. Each lens portion 112a corresponds to a positioning groove 115. Each lens portion 112a is configured for converging light. In this embodiment, the lens portions 112a are convex lenses and are arranged linearly. The main body 10 defines two inserting holes 112b in the second surface 112. The inserting holes 112b are configured for engaging with a mated connector (not shown). In this embodiment, the inserting holes 112b are positioned at two opposite ends of the lens portions 112a. Alternatively, the inserting holes 112b may be replaced by posts, and inserting holes may be defined in the mated connector.

The extending portion 12 is connected to a surface of the positioning portion 11 opposite to the second surface 112. In this embodiment, the extending portion 12 and positioning portion 11 are integrally formed with each other. The extending portion 12 defines a second assembling recess 121 communicating with the first assembling recess 113. A cross section of the second assembling recess 121 along a direction substantially parallel to the second surface 112 is smaller than that of the first assembling recess 113 for securely receiving the pressing block 20. The extending portion 12 defines a number of receiving grooves 122 in a bottom surface of the second assembling recess 121. The receiving grooves 122 correspond to the positioning grooves 115. A shape of each receiving groove 122 is substantially similar to that of each positioning groove 115, but an area of a cross section of a receiving groove 122 is larger than that of a positioning groove 115.

The main body 10 can be molded by an injection mold (not shown). Because a shape of the positioning grooves 115 and a shape of the receiving grooves 122 are polygonal, a structure of an injection mold for molding the positioning grooves 115 and the receiving grooves 122 easy to manufacture, so a precision of the structure is ensured. The rib portions 115c ensure a sturdiness of the positioning grooves 115 during a molding process, and the chamfering 115d eliminates a stress concentration at the intersections between the sidewalls 115b and the first bottom surface 114.

The pressing block 20 includes a top surface 201, a pressing surface 202 opposite to the top surface 201, two opposite slanting surfaces 203, and two opposite end surfaces 204. The top surface 201 is longer than the pressing surface 202. The opposite end surfaces 204 extend substantially perpendicularly from the top surface 201. The end surfaces 204 are connected to the pressing surface 202 by the slanting surfaces 203. A distance between the two end surfaces 204 is slightly larger than a distance between two ends of the assembling recess 113.

The optical fiber connector 100 is used to position the optical fibers 30. Each optical fiber 30 includes a fiber core 31 and a protection layer 32 surrounding a portion of the fiber core 31 The fiber core 31 is configured for transmitting optical signals, and the protection layer 32 is configured for protecting the fiber core 31 from being damaged. A portion of the fiber core 31 extends out of the protection layer 32.

Figure 4:
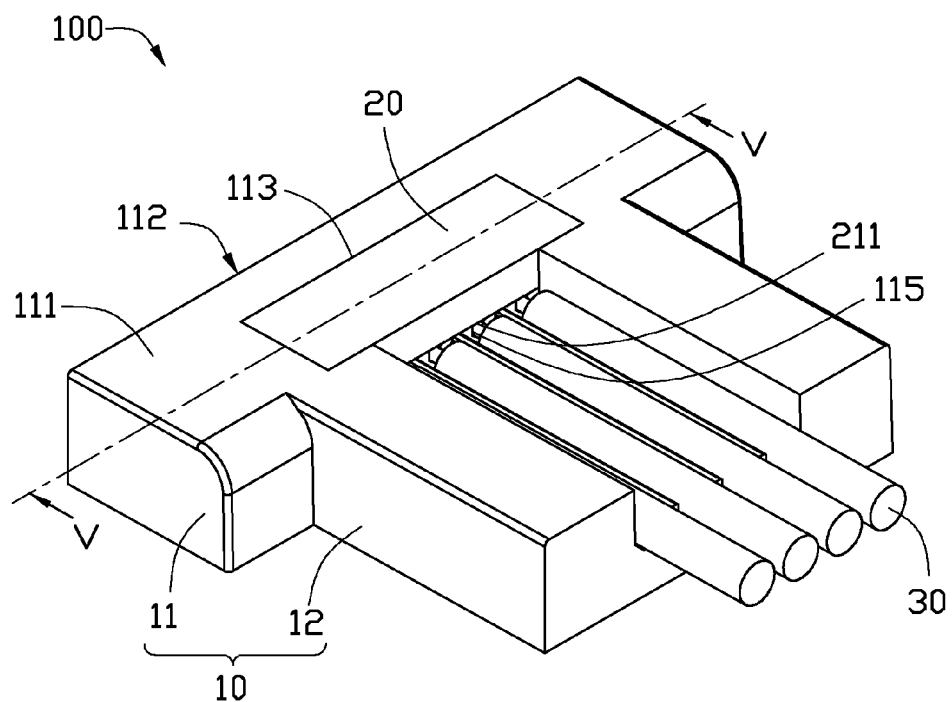
FIG. 4 is an assembled, isometric view of the optical fiber connector of FIG. 1.
Figure 5:
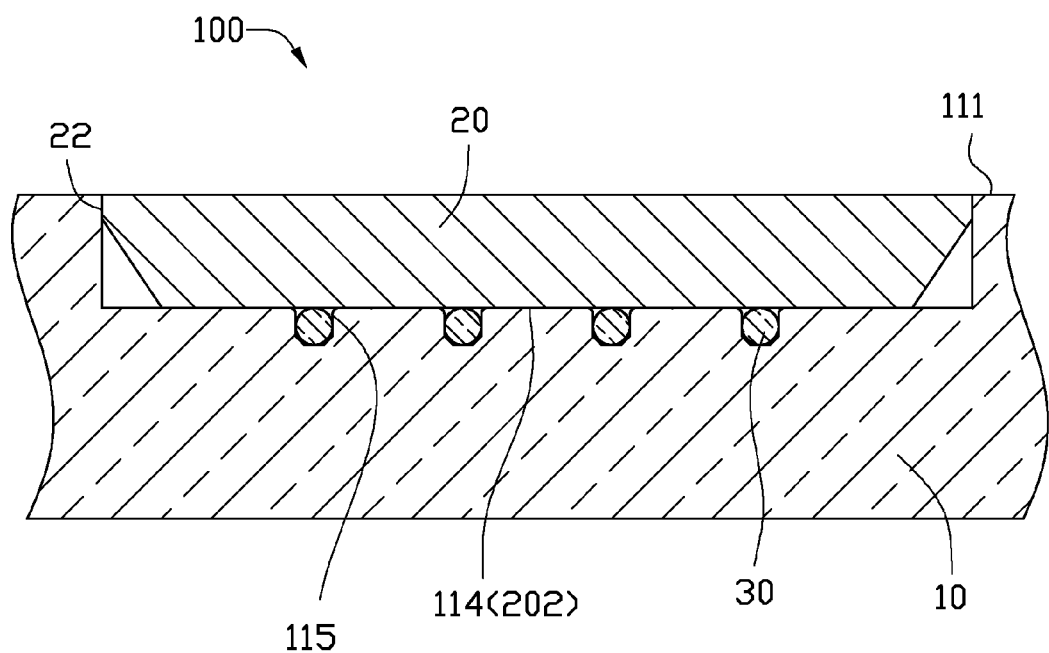
FIG. 5 is a cross-sectional view of the optical fiber connector of FIG. 4, taken along line V-V.

Referring to FIGS. 4-5, in assembly, each optical fiber 30 is received by a corresponding receiving groove 122 and a corresponding positioning groove 115. The exposed portion of the fiber core 31 is received in the positioning groove 115 and is supported by the second bottom surface 115a between the sidewalls 115b, while the protection layer 32 is received in the receiving groove 122. The exposed portion of the fiber core 31 can be fixed in the positioning groove 115 by an adhesive (not shown). The shape of the positioning grooves 115 helps facilitate a process of dispensing an adhesive therein. When the optical fibers 30 are positioned securely in the main body 10, the pressing block 20 is received in the first assembling recess 113, such that the pressing surface 211 contacts the first bottom surface 114 of the first assembling recess 113. The slanting surfaces 203 allow the pressing block 20 to be easily received by the assembling recess 113, and the slightly larger distance between the end surfaces 204 frictionally secure the pressing block 20 in the assembling recess 113.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical fiber connector for positioning a plurality of optical fibers, comprising:
    a main body defining a first assembling recess and a plurality of positioning grooves in a first bottom surface of the first assembling recess, each positioning groove comprising two opposite sidewalls and a second bottom surface; and
    a pressing block engaged with the first assembling recess, the pressing block comprising a pressing surface attached on the first bottom surface of the first assembling recess, an end of each optical fiber being received into a corresponding one of the positioning grooves and positioned by the sidewalls, the second bottom surface, and the pressing surface of the corresponding positioning groove;
    wherein the main body comprises a plurality of lens portions corresponding to the optical fibers in position, and each optical fiber is optically aligned with a corresponding one of the lens portions;
    wherein the main body comprises a positioning portion and an extending portion connected to the positioning portion, the first assembling recess is defined in the positioning portion, ends of the optical fibers pass through the extending portion and respectively positioned in the first positioning grooves;
    wherein the positioning portion comprises a first surface and a second surface substantially perpendicular to the first surface, the first assembling recess is defined in the first surface, and the lens portions are formed on the second surface.

2. The optical fiber connector of claim 1, wherein the lens portions are convex lenses.

3. The optical fiber connector of claim 1, wherein each positioning groove comprises a rib portion between each sidewall and the second bottom surface.

4. The optical fiber connector of claim 1, wherein the main body comprises a rounded edge between each sidewall and the first bottom surface.

5. The optical fiber connector of claim 1, wherein the pressing block comprises a top surface opposite to the pressing surface, and the top surface is longer than the pressing surface.

6. The optical fiber connector of claim 5, wherein the pressing block comprises two opposite slanting surfaces and two opposite end surfaces, the opposite end surfaces extend substantially perpendicularly from the top surface, the end surfaces are connected to the pressing surface by the slanting surfaces.

7. An optical fiber connector for positioning a plurality of optical fibers, comprising:
    a main body defining a first assembling recess and a plurality of positioning grooves in a first bottom surface of the first assembling recess, each positioning groove comprising two opposite sidewalls and a second bottom surface; and
    a pressing block engaged with the first assembling recess, the pressing block comprising a pressing surface attached on the first bottom surface of the first assembling recess, an end of each optical fiber being received into a corresponding one of the positioning grooves and positioned by the sidewalls, the second bottom surface, and the pressing surface of the corresponding positioning groove;
    wherein the main body comprises a plurality of lens portions corresponding to the optical fibers in position, and each optical fiber is optically aligned with a corresponding one of the lens portions;
    wherein the main body comprises a positioning portion, the positioning portion comprises a first surface and a second surface substantially perpendicular to the first surface, the first assembling recess is defined in the first surface, and the lens portions are formed on the second surface.

* * * * *